Dec. 25, 1962  H. BROUWER  3,070,759
REGULATED POWER INVERTER
Filed Oct. 7, 1959  3 Sheets-Sheet 1

INVENTOR.
HARVARD BROUWER
BY
*Ernest L. Brown*
Attorney

Dec. 25, 1962     H. BROUWER     3,070,759
REGULATED POWER INVERTER
Filed Oct. 7, 1959     3 Sheets-Sheet 3

*INVENTOR.*
HARVARD BROUWER
BY
*Ernest L. Brown*
Attorney

United States Patent Office 3,070,759
Patented Dec. 25, 1962

3,070,759
REGULATED POWER INVERTER
Harvard Brouwer, Grand Rapids, Mich., assignor, by mesne assignments, to Lear Siegler, Inc., Santa Monica, Calif., a corporation of Delaware
Filed Oct. 7, 1959, Ser. No. 845,023
31 Claims. (Cl. 331—113)

This invention pertains to a means for generating an alternating voltage, and more particularly to a means for generating an alternating voltage whose amplitude and frequency are independent of the amplitude of the input voltage.

In present known power inverters, and particularly in power inverters which are utilized in aircraft to change direct voltage to an alternating voltage, not only the magnitude of the output voltage, but also the frequency of the output voltage is a function of the magnitude of the direct input voltage.

The saturation resistance of transistors varies with temperature and other parameters of the circuit. In present known devices, the saturation resistance of the transistors are in the frequency determining portion of the circuit to thereby cause the frequency of the output voltage to vary as the saturation resistance varies.

In present known power inverters, transient conditions occur during the switching of the transistors which causes voltage spikes and other phenomena which may damage the transistors or other portions of the circuit.

In the device contemplated by this invention, the voltage spikes during the switching transient are limited, thereby preventing damage to the components of the circuit. Further, the saturation resistance of the conducting transistor is not connected in the frequency determining portion of the circuit so that changes in the saturation resistance do not affect the frequency or amplitude of the output voltage. Hence, the circuit of this invention is more stable and the output voltage amplitude and frequency are more predictable than that of any previously known power inverter.

It is, therefore, an object of this invention to provide a novel, regulated power inverter.

It is another object of this invention to provide a novel regulated means for changing a direct voltage to an alternating voltage.

It is also an object of this invention to provide a novel transistorized oscillator which is adapted to be utilized as a power inverter.

It is a further object of this invention to provide a transistorized power inverter whose output voltage amplitude and frequency is substantially independent of the amplitude of the input voltage.

It is yet another object of this invention to provide a transistorized power converter wherein the switching transients are suppressed.

Other objects will become apparent from the following description when taken in connection with the accompanying drawings in which.

Figure 1:
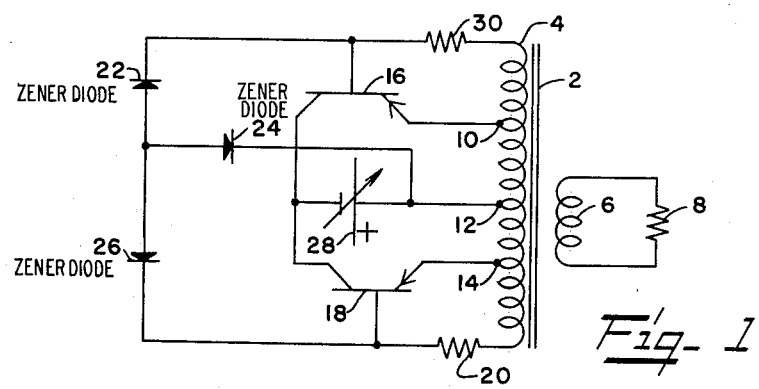
FIG. 1 is a schematic diagram of a basic circuit of the device of this invention utilizing PNP transistors.

In FIG. 1, a pair of PNP transistors 16 and 18 are push-pull connected by their bases through current limiting resistance means 30 and 20, respectively, to opposite ends of a primary winding 4 of saturable reactor 2. Saturable reactor 2 has a secondary winding 6 connected to a load 8, and a primary winding 4 which is center-tapped at 12. A pair of taps 10 and 14 are symmetrically disposed relative to center tap 12 intermediate center tap 12 and the ends of winding 4. The emitters of transistors 16 and 18 are push-pull connected to taps 10 and 14, respectively. A source of direct voltage 28, which does not necessarily have a constant amplitude, is connected by its positive terminal to center tap 12 of winding 4 and by its negative terminal to the collectors of transistors 16 and 18. Diodes 22, 24 and 26 are Y-connected with their anodes connected in common. The cathodes of diodes 22, 24 and 26 are connected, respectively, to the base of transistor 16, to the center tap 12 of winding 4 and to the base of transistor 18.

Figure 2:
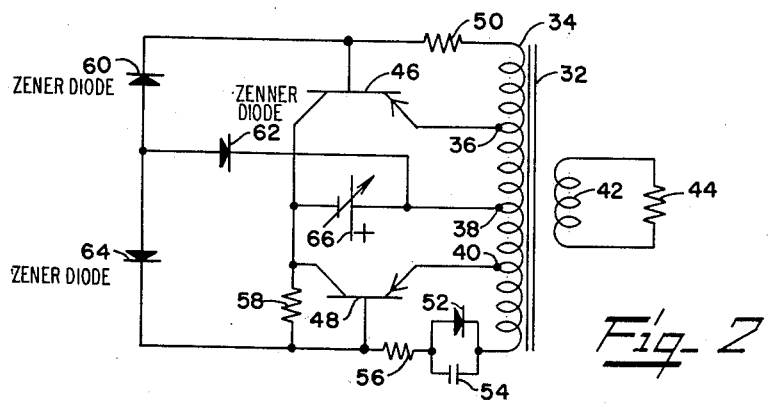
FIG. 2 is a schematic diagram of the circuit of FIG. 1 and further comprising means for generating a starting transient.

FIG. 2 is identical to FIG. 1 except for the addition of elements 52, 54 and 58. Elements 32, 34, 36, 38, 40, 42, 44, 46, 48, 50, 56, 60, 62, 64 and 66 of FIG. 2 correspond, respectively, to elements 2, 4, 10, 12, 14, 6, 8, 16, 18, 30, 20, 22, 24, 26 and 28 of FIG. 1.

Resistance means, such as resistor 58, is connected between the collector and base of transistor 48 to unbalance transistor 48 thereby to generate a starting potential. The circuit of diode 52 in parallel with condenser 54 is connected in series with resistance means 56 between the base of transistor 48 and its associated end of winding 34 with the anode of diode 52 toward the base of transistor 48. It is to be noted that elements 58, 52, and 54 could have been connected conveniently to transistor 46 rather than transistor 48.

Figure 3:
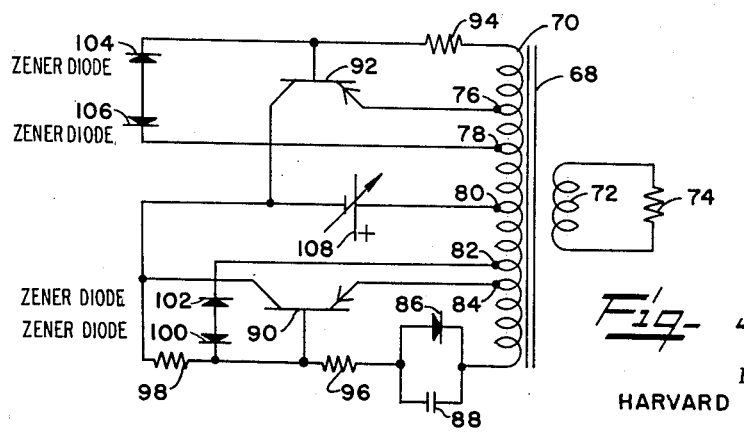
FIG. 3 is an alternative embodiment of the device of FIG. 1.

In FIG. 3, a pair of PNP transistors 92 and 90 are push-pull connected by their bases through resistance means 94 and 96, respectively, and through starting means 86 and 88 to opposite ends of primary winding 70 of saturable reactor 68. It is to be noted that starting means 86 and 88 conveniently may be shorted and some other starting means utilized. Saturable reactor 68 has a secondary winding 72 connected to a load 74, and a primary winding 70 with a center tap 80. A first pair of taps 78 and 82 are positioned symmetrically relative to center tap 80 intermediate center tap 80 and the ends of winding 70. A second pair of taps 76 and 84 are positioned on winding 70 symmetrically relative to center tap 80 intermediate the first pair of taps 78 and 82 and the ends of primary winding 70. The emitters of transistors 92 and 90 are push-pull connected to taps 76 and 84, respectively. A source of direct voltage 108, which is not necessarily a source whose voltage amplitude is constant, is connected by its positive terminal to center tap 80 and by its negative terminal to the collectors of transistors 92 and 90. Resistance means, such as resistor 98, is connected between the collector and base of transistor 90 to operate in conjunction with means 86 and 88 to generate a starting potential for the circuit. Starting means 86 and 88 form a parallel connection which is connected in series between resistance means 96 and the end of winding 70 with the anode of diode 86 connected toward the base of transistor 90. It is to be noted that elements 98, 86 and 88 conveniently may be connected into the circuit adjacent to transistor 92 rather than into the circuit adjacent to transistor 90. A first pair of diodes 104 and 106 are connected together by their common anodes.

The cathodes of diodes 106 and 104 are connected, respectively, to tap 78 of winding 70 and to the base of transistor 92. A second pair of diodes 102 and 100 are connected together by their common anodes. The cathodes of diodes 102 and 100 are connected, respectively, to tap 82 of winding 70 and to the base of transistor 90.

Figure 4:
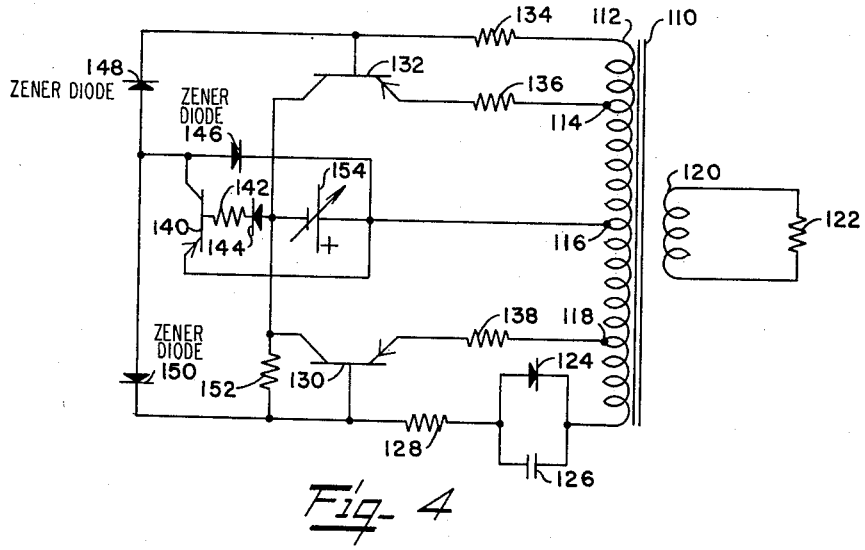
FIG. 4 is a schematic diagram of a modified version of the circuit of FIG. 1 and further including a third PNP transistor as protection against supply voltage transients.

In FIG. 4, first and second PNP transistors 132 and 130 have their bases push-pull connected through resistance means 134 and 128 and through starting means 124 and 126 to opposite ends of primary winding 112 of saturable reactor 110. It is to be noted that elements 124 and 126 conveniently may be shorted and other starting means substituted. Saturable reactor 110 has a secondary winding 120 connected to a load 122, and a primary winding 112 which is center tapped at 116. A pair of taps are symmetrically disposed relative to center tap 116 at 114 and 118 intermediate the center tap 116 and the ends of primary winding 112. The emitters of transistors 132 and 130 are push-pull connected through resistance means 136 and 138 to taps 114 and 118, respectively. A source of direct voltage, whose amplitude is not necessarily constant, is connected by its positive terminal to center tap 116 of winding 112 and by its negative terminal to the collectors of transistors 132 and 130. Diodes 146, 148 and 150 are Y-connected with their anodes in common. The cathodes of diodes 146, 148 and 150 are connected, respectively, to the center tap 116 of winding 112, to the base of transistor 132, and to the base of transistor 130. A third PNP transistor 140 is connected by its emitter to the center tap 116 of winding 112 and by its collector to the anodes of diodes 146, 148 and 150. Diode 144 is connected by its anode to the collectors of transistors 132 and 130 and by its cathode through current limiting resistor 142 to the base of transistor 140. Resistance means, such as resistor 152, is connected between the collector and base of transistor 130 to generate a starting transient. The parallel combination of diode 124 and condenser 126 is connected in series with resistance means 128 between the base of transistor 130 and its associated end of primary winding 112 with the anode of diode 124 toward the base of transistor 130. It is to be noted that elements 152, 124 and 126 may be connected conveniently in association with transistor 132 rather than with transistor 130.

Figure 5:
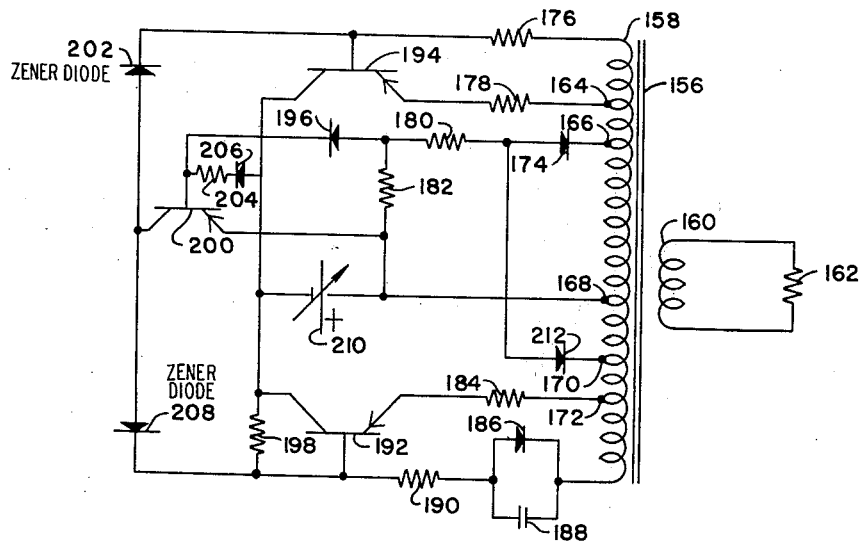
FIG. 5 is another modification of the circuit of FIG. 1 and further uilizing a third PNP transistor as protection against supply voltage transients and as part of the regulation circuit.

In FIG. 5, a pair of PNP transistors 192 and 194 have their bases push-pull connected through resistance means 176 and 190 and through starting means 186 and 188 to opposite ends of primary winding 158 of saturable transformer 156. It is to be noted that starting means 186 and 188 may optionally be shorted and other starting means (not shown) substituted therefor. Saturable transformer 156 has a secondary winding 160 connected to a load 162, and a primary winding 158 with a center tap at 168. A first pair of taps, symmetrically disposed relative to center tap 168 at 166 and 170, are positioned intermediate center tap 168 and the ends of winding 158. Taps 164 and 172 are symmetrically disposed relative to center tap 168 intermediate taps 166 and 170, respectively, and the ends of primary winding 158. The emitters of transistors 194 and 192 are push-pull connected through resistance means 178 and 184 to taps 164 and 172, respectively, of primary winding 158. A direct voltage source 210, not necessarily of constant amplitude, is connected by its positive terminal to center tap 168 of winding 158 and by its negative terminal to the collectors of transistors 194 and 192. A pair of diodes 202 and 208 have their anodes connected in common and their cathodes connected, respectively, to the bases of transistors 194 and 192. A third PNP transistor 200 has its collector connected to the anodes of diodes 202 and 208. The emitter of transistor 200 is connected to the center tap 168 of primary winding 158. Diode 206 is connected by its anode to the collectors of transistors 194 and 192 and by its cathode, through current limiting resistor 204, to the base of transistor 200. A second pair of diodes 174 and 212 are connected with their anodes in common and with their cathodes connected to terminals 166 and 170, respectively. A voltage dividing network of resistors 180 and 182 is connected at one end to the anodes of diodes 174 and 212 and at the other end to the center tap 168 of primary winding 158. It is to be noted that the ratio of resistances of resistors 180 and 182 may be varied at will in some predetermined fashion or may, alternatively, be variable. Diode 196 is connected by its anode to the adjustable voltage terminal at the junction of the voltage dividing means 180 and 182 and is connected by its cathode to the base of transistor 200. Resistance means 198 is connected between the collector and base of transistor 192 to provide a starting potential for the circuit. Diode 186 in parallel with condenser 188 is connected in series with resistance means 190 between the base of transistor 192 and its adjacent end of primary winding 158 with the anode of diode 186 toward the base of transistor 192. It is to be noted that resistance means 198, diode 186 and condenser 188 conveniently may be positioned in the circuit adjacent transistor 194 without changing the circuit in any material manner.

Figure 6:
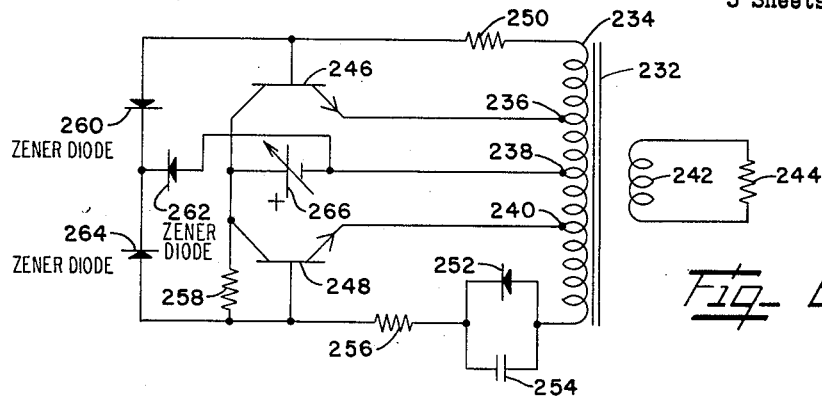
FIG. 6 is a schematic diagram of the circuit of FIGS. 1 and 2 utilizing NPN transistors.

FIG. 6 is identical to FIG. 2 except the transistors 46 and 48 of FIG. 2 are PNP transistors while transistors 246 and 248 of FIG. 6 are NPN transistors, and the polarities of the various diodes and voltages are reversed.

A pair of NPN transistors 246 and 248 are push-pull connected by their bases through resistance means 250 and 256 and through starting means 252 and 254 to opposite ends of primary winding 234 of saturable transformer 232. It is to be noted that elements 252 and 254 may be shorted and other means provided for starting the operation of the circuit. Saturable transformer 232 has a secondary winding 242 connected to a load 244, and a primary winding 234 which is center tapped at 238. A pair of taps 236 and 240 are symmetrically disposed relative to center tap 238 intermediate center tap 238 and the ends of primary winding 234. The emitters of transistors 246 and 248 are push-pull connected to terminals 236 and 240, respectively. Voltage source 266 is connected by its positive terminal to the collectors of transistors 246 and 248 and by its negative terminal to the center tap 238 of winding 234. It is to be noted that voltage source 266 does not necessarily have a constant amplitude, but may actually have a voltage amplitude which varies between wide limits. Diodes 260, 262 and 264 are Y-connected with their cathodes in common and with their anodes connected, respectively, to the base of transistor 246, to the center tap 238 of winding 234, and to the base of transistor 248. Resistor 258 is connected between the collector and base of transistor 248 to provide a starting potential. The parallel connection of diode 252 and condenser 254 is connected in series with resistance means 256 between the base of transistor 248 and its adjacent end of primary winding 234 to permit a starting potential. The cathode of diode 252 is connected toward the base of transistor 248.

Figure 7:
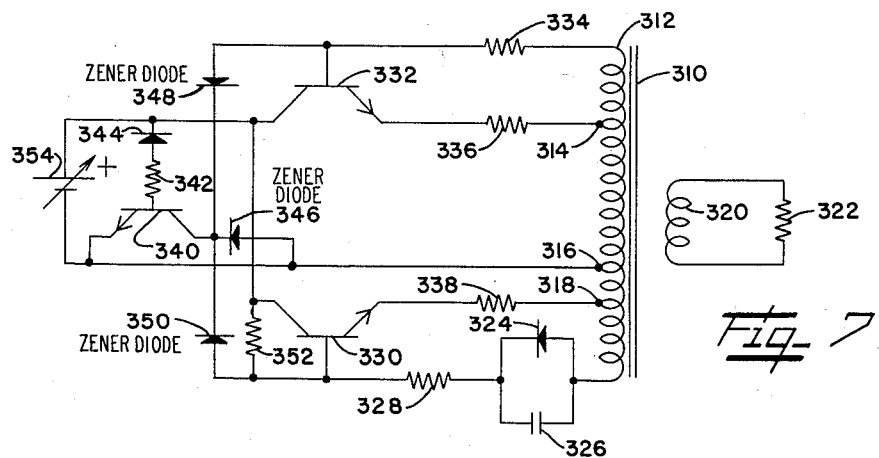
FIG. 7 is a schematic diagram of the circuit of FIG. 4 utilizing NPN transistors.

FIG. 7 is identical with FIG. 4 except the transistors of FIG. 7 are NPN transistors while the transistors of FIG. 4 are PNP transistors, and the polarities of the diodes and of the voltage source of FIG. 7 have been reversed from that of FIG. 4.

In FIG. 7, transistors 332 and 330 are push-pull connected by their bases through resistance means 334 and 328 and through starting means 324 and 326 to opposite ends of primary winding 312 of saturable transformer 310. Saturable transformer 310 has a secondary winding 320 which is connected to a load 322, and a primary winding 312 which is center tapped at 316. Taps 314 and 318 are symmetrically disposed relative to center tap 316 intermediate center tap 316 and the ends of winding 312. The emitters of transistors 332 and 330 are push-pull connected through resistance means 336 and 338, respectively, to taps 314 and 318. A source of voltage, which is not necessarily of a constant magnitude, is connected by its positive terminal to the collectors of transistors 332 and 330 and by its negative terminal to center tap 316 of winding 312. A third NPN transistor 340 is connected by its emitter to the center tap 316 of winding 312 and by its collector to the common cathodes of Y-connected diodes 348, 346 and 350. Diode 344 is connected by its cathode to the collectors of transistors 332 and 330 and by its anode through current limiting resistance means 342 to the base of transistor 340. The anodes of Y-connected diodes 348, 346 and 350 are connected, respectively, to the base of transistor 332, to the center tap 316 of winding 312, and to the base of transistor 330. Resistance means 352 is connected between the collector and base of transistor 330 to unbalance transistor 330 to create a starting potential. The parallel connection of diode 324 and condenser 326 is connected, with the cathode of diode 324 toward the base transistor 330, in series with resistance means 328 between the base of transistor 330 and its adjacent end of winding 312 to permit starting.

Figure 8:
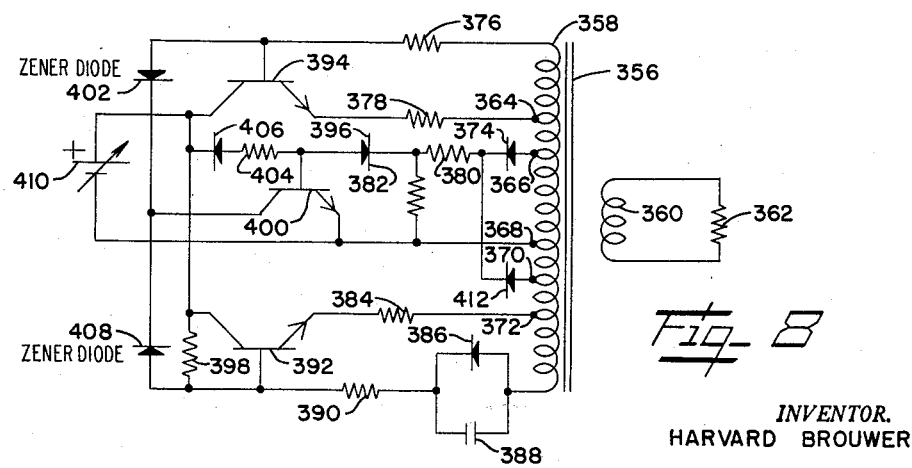
FIG. 8 is a schematic diagram of the circuit of FIG. 5 utilizing NPN transistors.

FIG. 8 is identical to FIG. 5 except NPN transistors have been substituted in FIG. 8 for PNP transistors of FIG. 5, and the polarities of the diodes and of the voltage source of FIG. 8 are opposite to that of FIG. 5.

In FIG. 8, transistors 394 and 392 are push-pull connected by their bases through resistance means 376 and 390 and through starting means 386 and 388 to opposite ends of primary winding 358 of saturable transformer 356. Saturable transformer 356 has a secondary winding 360 connected to a load 362, and a primary winding 358 which is center tapped at 368. A pair of taps 366 and 370 are symmetrically disposed relative to center tap 368 intermediate center tap 368 and the ends of winding 358. A second pair of taps 364 and 372 are symmetrically disposed relative to center tap 368 intermediate taps 366 and 370, respectively, and the ends of winding 358. The emitters of transistors 394 and 392 are push-pull connected through resistance means 378 and 384 to taps 364 and 372, respectively, of winding 358. Voltage source 410, which is not necessarily of constant amplitude, is connected by its positive terminal to the collectors of transistors 394 and 392 and by its negative terminal to the center tap 368 of winding 358. A pair of diodes 402 and 408 are connected with their cathodes in common and with their anodes connected to the bases of transistors 394 and 392, respectively. A third NPN transistor 400 is connected by its collector to the cathodes of diodes 402 and 408. The emitter of transistor 400 is connected to the center tap 368 of winding 358. Diode 406 is connected to its cathode to the collectors of transistors 394 and 392 and by its anode through current limiting resistor 404 to the base of transistor 400. A second pair of diodes 374 and 412 are connected with their cathodes in common and with their anodes connected, respectively, to taps 366 and 370. A voltage dividing network of series resistors 380 and 382 is connected at one end to the cathodes of diodes 374 and 412 and is connected at the other end to the center tap 368 of winding 358. It is to be noted that the ratio of resistances of resistors 382 and 380 may be varied at will in some predetermined fashion. A diode 396 is connected by its cathode to the variable voltage tap of the voltage dividing network at the junction of resistors 380 and 382 and by its anode to the base of transistor 400. Resistance means 398 is connected between the collector and base of transistor 392 to unbalance transistor 392 to create a starting potential. The parallel connection of diode 386 and condenser 388 is connected, with the cathode of diode 386 toward the base of transistor 392, in series with resistance means 390 between the base of transistor 392 and its adjacent end of winding 358. It is to be noted that elements 398, 386 and 388 could conveniently be inserted in the circuit adjacent to transistor 394 without changing the substance of the network.

In operation of FIG. 1, it may be assumed that one of the transistors (for example transistor 16) has in some manner been caused to conduct. A typical starting circuit is explained later in connection with the description of operation of FIG. 2. When transistor 16 conducts, saturable transformer 2 eventually saturates which causes a voltage to be induced in winding 4 to apply a negative voltage to the base of transistor 18 to cause transistor 18 to conduct and a positive voltage to the base of transistor 16 to cause transistor 16 to stop conducting. When transistor 18 conducts, the voltage between terminals 12 and 14 is limited and thus regulated to the zener voltage of diode 24 plus the forward voltage of diode 26, plus the voltage from the base to the emitter to transistor 18. The current flow through transistor 18 causes transformer 2 to saturate and induce a voltage in winding 4 of the proper polarity to stop conduction of transistor 18 and to start conduction of transistor 16. Thus, the circuit of FIG. 1 continues to oscillate after the fashion of a multi-vibrator and to generate an alternating voltage in secondary winding 6 which is then applied to load 8. Because the voltages between taps 10 and 12 and between taps 14 and 12 are independent of the amplitude of voltage source 28, the amplitude and frequency of the voltage applied to load 8 are independent of the amplitude of voltage source 28.

When transformer 2 saturates by virtue of a flow of current through transistor 18, a positive spike of voltage tends to appear at the base of transistor 18 and a negative spike of voltage appears at the base of transistor 16 resulting from reactive properties within the circuit or load. It is to be noted that the voltage on the base of transistor 18 cannot exceed a positive value, relative to terminal 10, beyond the limit set by the emitter to base voltage of transistor 16 plus the forward voltage of diode 22 plus the zener voltage of diode 26. When terminal 14 is driven positive beyond the normal conducting base-to-emitter voltage, transistor 18 tends briefly to conduct to cause a current to flow within winding 4 of transformer 2 in a direction to counter the generation of a spike of voltage. The cancellation of spike voltage is caused by changes of current flow within the portion of winding 4 between terminals 10 and 14.

FIG. 2 differs from FIG. 1 in that it has a typical starting circuit of resistor 58, diode 52, and condenser 54. To start the circuit of FIG. 1, it is necessary to unbalance the circuit in some predetermined manner. In FIG. 2, the resistance of resistor 58 is relatively high to prevent shorting the collector of transistor 48 to its base, but is of sufficiently low resistance to provide an unbalanced conducting path through the base to emitter of transistor 48. The quantity of unbalanced current is relatively small during the operation of the starting circuit. After conduction is started in transistor 48, the circuit of FIG. 2 operates after the fashion of the circuit of FIG. 1 as described above. Condenser 52 is essentially a short circuit at steady state frequencies and the condenser-diode combination offers a high impedance during starting conditions.

The operation of the starting portion of the circuit of the remaining figures is identical to that just described for FIG. 2.

When higher input voltages are applied at 66 in FIG. 2, diode 62 may become overloaded which results in decreased efficiency. It is then desirable to utilize the circuit of FIG. 3 wherein diodes 102 and 106 are substituted for diode 62 and are connected to their respective taps 82 and 78. In FIG. 3, assuming that transistor 92 is conducting, the voltage between taps 78 and 76 is limited and thus regulated to the zener voltage of diode 106 plus the forward voltage of diode 104 plus the base-to-emitter voltage of transistor 92. The voltage between taps 78 and 76 is maintained at this predetermined value until transformer 68 saturates. When transformer 68 saturates, a positive voltage is applied to the base of transistor 92 to cause transistor 92 to cease to conduct and a negative voltage is applied to the base of transistor 90 to cause transistor 90 to start conducting. When transistor 90 conducts, the voltage between terminals 82 and 84 is equal to the zener voltage of diode 102 plus the forward voltage of diode 100 plus the base-to-emitter voltage of transistor 90, and is maintained at this predetermined value until transformer 68 again staturates. When transformer 68 again saturates, a positive voltage is applied to transistor 90 to stop its conducting and a negative voltage is applied to transistor 92 to again start the conduction of transistor 92. The circuit of FIG. 3 then operates after the fashion of a multi-vibrator to cause an alternating voltage to appear across secondary winding 72 which is applied to load 74.

When a negative voltage spike is applied to the base of one transistor (for example transistor 90), a positive voltage spike is applied to the base of the other transistor (for example transistor 92). The positive voltage on the base of transistor 92 cannot exceed the forward voltage of diode 106 plus the zener voltage of diode 104. When the emitter of transistor 92 is driven beyond the normal conducting base-to-emitter voltage, transistor 92 tends briefly to conduct to cause a current flow within the winding 70 of transformer 68 in a direction to counter the generation of a spike of voltage. The main cancellation is caused by current flow within the portion of the winding between terminals 80 and 76.

The circuit of FIG. 4 is similar to that of FIG. 2 except that the transistor circuit associated with transistor 140 has been added to protect against large swings of input voltage, and that current limiting resistors 136 and 138 have been placed in the emitter circuit. These resistors 136 and 138 are optional, depending upon the characteristics of the individual transistors. In FIG. 4, the circuit is started by means of a resistor 152, diode 124 and condenser 126 which unbalances the circuit to cause a starting transient which starts the transistor 130 operating in accordance with the description of operation of the starting circuit of FIG. 2. Assuming transistor 130 conducts until transformer 110 saturates, transistor 130 then receives a positive voltage on its base to stop transistor 130 from conducting. Simultaneously, a negative voltage is caused to appear at the base of transistor 132 to cause transistor 132 to start conducting. Transistor 132 continues to conduct until transformer 110 again saturates. When transformer 110 again saturates, a positive voltage is applied to the base of transistor 132 to stop it from conducting. Simultaneously, a negative voltage appears at the base of transistor 130 to re-start conduction therein. Thus, the operation of transistors 132 and 130 after the fashion of a multi-vibrator causes an alternating voltage to appear on the secondary winding 120 of transformer 110 which is applied to load 122.

Voltage and frequency regulation plus transient protection is provided by diodes 146, 148 and 150, as described in connection with the operation of FIG. 1. When the voltage of voltage supply 154 swings to a large value, zener-connected diode 144 begins to conduct through resistor 142 which causes transistor 140 to substantially create a short-circuit between the anodes of diodes 146, 148 and 150 and the center tap 116 of winding 112. Actually, this voltage is reduced to a very small value due to the forward voltage of diodes 148 and 150 and to the base-to-collector voltage of transistors 130 and 132. Thus, a swing of voltage of source 154 to a high value causes transistor 140 to act as a switch to reduce the voltage applied to the circuit to substantially zero.

In FIG. 5, when the switch is closed, transistor 192 is caused to conduct. With the voltage polarity shown, diode 186 offers a high impedance path to a flow of current and resistor 198 causes a negative potential to be applied to the base of transistor 192 to cause transistor 192 to start conducting. When transistor 192 conducts, current flows in winding 158 of transformer 156 to cause transformer 156 to saturate. When transformer 156 saturates, a positive voltage is impressed on the base of transistor 192 to cause transistor 192 to stop conducting. Simultaneously, a negative voltage is supplied to the base of transistor 194 to cause transistor 194 to start conducting. Condenser 188 has a capacitance which is of a proper value to provide a substantially short circuit at the frequency of operation of the oscillating circuit of FIG. 5. When transistor 194 conducts, the voltage between terminals 164 and 168 equals the emitter to base voltage of transistor 194 plus the forward voltage of diode 202 plus the collector to emitter voltage of transistor 200. This voltage is controlled to be substantially constant when transistor 200 conducts. Transistor 200 conducts when the voltage at the junction between resistors 180 and 182 reaches a predetermined magnitude which is determined by the zener characteristics of diode 196. By adjusting the ratios of the resistances of resistors 180 and 182, transistor 200 is caused to conduct when the voltage applied to terminals 166 or 170 reaches some predetermined magnitude. As the voltage between terminals 166 and 168 increases negatively, diode 174 is biased with the proper polarity to cause current flow through diode 174 and resistors 180 and 182. The voltage between terminals 166 and 168 must reach some predetermined value, depending upon the ratios of resistances of resistors 180 and 182, to overcome the zener voltage of diode 196 to cause base current to flow in transistor 200 thereby to limit the voltage which is generated between terminals 164 and 168 to a constant maximum value. When the voltage of voltage source 210 increases beyond some predetermined safe value, the zener-biased diode 206 causes current to flow in the base of transistor 200 which limits the voltage generated between terminals 164 and 168 or between terminals 172 and 168. During the next half-cycle, the voltage between terminals 172 and 168 is caused to increase which causes diode 212 to conduct and to apply a voltage to voltage divider network 180 and 182. When this voltage reaches a predetermined value, zener diode 196 conducts to cause a base current to flow in transistor 200 and the voltage between terminals 172 and 168 is thereby limited to the emitter-to-base voltage to transistor 192 plus the forward voltage of transistor 208 plus the collector-to-emitter voltage of transistor 200. Thus, the circuit of FIG. 5 provides improved regulation. The circuit of FIG. 5 continues to oscillate after the fashion of a multi-vibrator and to generate an alternating voltage in secondary winding 160 which is then applied to load 162. Transient conditions within the circuit are limited in the same manner as that described in the operation of FIG. 1.

In FIG. 6, when the circuit is first turned on, diode 252 becomes a high impedance path to allow the base of transistor 248 to become positive through a conducting path of resistance means 258. After the circuit reaches a steady state condition, condenser 254 acts substantially as a short circuit in parallel with diode 252 and the resistance of resistor 258 is very high so that it does not short the collector to the base of transistor 248. Assuming that transistor 248 conducts, transformer 232 eventually saturates to produce a negative voltage on the base of transistor 248 to thereby stop the conduction of transistor 248 and to place a positive voltage on the base of transistor 246 to cause transistor 246 to start conducting. Thus the circuit operates in a multi-vibrator fashion to generate an alternating current in transformer 232 which induces a voltage into winding 242 which is applied to load 244. When transistor 246 is conducting, the voltage between terminals 236 and 238 is equal to the zener voltage of diode 262 plus the forward voltage of diode 260 plus the base-to-emitter voltage of transistor 246, which is substantially a constant value. Similarly, when transistor 248 conducts, the voltage between terminals 240 and 238 is equal to the zener voltage of diode 262 plus the forward voltage of diode 264 plus the base-to-emitter voltage of transistor 248. When transformer 232 saturates due to a flow of current through transistor 246, the base of transistor 246 receives a negative spike and a positive spike of voltage occurs at the base of transistor 248 due to transient conditions within the circuit. The voltage on the base of transistor 246 cannot exceed a negative value relative to terminal 240 beyond the limit set by the emitter to base voltage of transistor 248 plus the forward voltage of diode 264 plus the zener voltage of diode 260, and the voltage on the base of transistor 246 is maintained at this negative value so that when terminal 236 is driven beyond the normal conducting base-to-emitter voltage, transistor 246 tends to briefly conduct to cause a current to flow within the winding 234 of transformer 232 in a direction to counter the generation of a spike of voltage. The cancellation of the voltage spike is caused by changes of current flow within the portion of winding 234 between terminals 236 and 240.

The circuit of FIG. 7 is identical to that of FIG. 6 except for the addition of diode 344, resistance means 342, and transistor 340. In FIG. 7, diode 344 is zener-biased relative to voltage source 354 so that when the amplitude of the voltage of source 354 reaches an excessive value, diode 344 conducts to cause a base current in transistor 340. The presence of the base current in transistor 340 causes transistor 340 to conduct emitter-to-collector thereby effectively to connect the cathodes of diodes 348, 346 and 350 to the center tap 316 of winding 312, which limits the voltage between terminals 314 and 316 or between terminals 318 and 316.

In FIG. 8, transistor 392 is started when the circuit is first turned on, after the fashion described above in connection with FIG. 6. After transistor 392 starts to conduct, the current in winding 358 continues to increase until transformer 356 saturates. When transformer 356 saturates, a negative voltage is induced on the base of transistor 392 to stop conduction of transistor 392 and a positive voltage is induced in the base of transistor 394 to start conduction thereof. Thus transistors 392 and 394 operate in a multi-vibrator fashion to cause a voltage to appear on the secondary winding 360 which is then applied to load 362. When transistor 394 conducts, diode 374 is properly forward-biased to cause a positive voltage to appear on the cathodes of diodes 374 and 412 which is then applied across the voltage dividing network of resistors 380 and 382. The ratios of resistances of resistors 380 and 382 are predetermined in accordance with a desired value of voltage to be limited between terminals 364 and 368 and between terminals 372 and 368. As the voltage applied to the cathodes of diodes 374 and 412 increases, the voltage at the junction between resistors 380 and 382 also increases until it reaches a voltage to cause conduction of zener-biased diode 396, which causes current to flow in the base of transistor 400. When current flows in the base of transistor 400, the voltage between terminals 364 and 368 is limited by the essentially constant emitter-to-collector voltage of transistor 400 plus the forward voltage of diode 402, plus the base-to-emitter voltage of transistor 394. Similarly, when transistor 392 conducts, terminal 370 becomes positive to cause diode 412 to conduct to a apply a positive voltage to the cathodes of diodes 374 and 412, which voltage is then conductively applied through voltage dividing network 380 and 382 to the cathode of diode 396. When the voltage applied to the cathode of diode 396 reaches a predetermined value as determined by the zener conducting characteristics of diode 396, base current of transistor 400 starts to flow which limits the voltage between terminals 372 and 368 to the emitter-to-collector voltage of transistor 400 plus the forward voltage of diode 308 plus the base-to-emitter voltage of transistor 392. When the voltage of voltage source 410 exceeds a predetermined value which causes zener biased diode 406 to conduct, base current flows in transistor 400 which connects the cathodes of diodes 402 and 408 to center tap 368 to thereby limit the voltage at terminals 364 and 372 relative to terminal 368.

The frequency of this oscillator is primarily dependent on the voltage applied to the primary winding thereof, the number of primary winding turns of the transformer, and the magnetic characteristics of the core material of the transformer. The frequency of the oscillator is given by the formula:

$$f = \frac{V}{4NB_{max}A_c 10^{-8}}$$

where $f$=the frequency in cycles per second; $V$=voltage applied to the primary winding of the transformer; $N$=number of turns of the primary winding of the transformer; $B_{max}$=transformer core saturation flux density in lines per square inch; and $A_c$=core area in square inches. It must be noted that all of these constants which determine the frequency are constant characteristics of the transformer except V. In each of the embodiments of this invention, V is substantially constant value as described above. For example, in FIG. 1, V is maintained constant by maintaining the voltage between terminals 10 and 12 and between terminals 14 and 12 constant during conduction regardless of the amplitude of supply voltage 28. Similarly, in FIG. 2 the voltage between terminals 36 and 38 and terminals 40 and 48 are maintained constant. In FIG. 3, the voltage between terminals 76 and 80 and between terminals 84 and 80 are maintained constant. In FIG. 4, the voltage between terminals 114 and 116 and between terminals 118 and 116 are maintained constant. In FIG. 5, the voltage between terminals 164 and 168 and between terminals 172 and 168 are maintained constant. In FIG. 6, the voltage between terminals 236 and 238 and between terminals 240 and 238 are maintained constant. In FIG. 7, the voltage between terminals 314 and 316 and between terminals 318 and 316 are maintained constant. In FIG. 8, the voltage between terminals 364 and 368 and between terminals 372 and 368 are maintained constant. Each of the frequency determining parameters is maintained constant in the device of this invention. Further, with a constant voltage on the primary winding of the transformer, it is to be expected (and such is the case) that the secondary voltage amplitude will be constant.

Thus, the device of this invention generates a substantially constant amplitude and constant frequency alternating voltage which is adapted to supply power to a load under varying supplying voltage amplitudes. In a vehicle such as an aircraft, where the direct supply voltage has an amplitude that varies with varying loads, the device of this invention provides an alternating voltage supply of constant frequency and voltage for radio and navigation equipment, and the like. Further, as described above, the circuit of this invention has certain self-protecting features which prevent overload of the elements and limit the generation of destructive voltages and currents which may damage the sensitive transistors and diodes of the circuit.

Although the invention has been described in detail above, it is not intended that this description should limit the invention, but only that the invention should be limited in accordance with the spirit and scope of the following claims.

I claim:

1. In combination: a saturable transformer having a center-tapped primary and a secondary winding, a pair of taps intermediate said center tap and the ends of said windings; a pair of transistors push-pull connected by their bases to the ends of said primary winding and by their emitters to said intermediate taps, the collectors of said transistors being connected together; a voltage source connected between the collectors of said transistors and said center tap; and voltage limiting means connected between said center tap and said bases for limiting the amplitude of voltage applied therebetween and for holding the amplitude of the alternating voltage appearing on the primary and secondary windings of said transformers to a constant amplitude and frequency.

2. A device as recited in claim 1 wherein said voltage limiting means for limiting the voltage comprises: three diodes Y-connected by the same electrode and connected by the extremities of said Y to the bases of said transistors and to the center tap of said transformer.

3. A device as recited in claim 1 and further comprising means for unbalancing one of said transistors to cause a starting transient.

4. A device as recited in claim 3 wherein said voltage limiting means for limiting voltage between the center tap and the bases of said transistors comprises: three diodes Y-connected by the same electrode and connected by the extremities of said Y to the bases of said transistors and to said center tap.

5. A device as recited in claim 3 and further comprising: a third transistor connected by its collector to the common terminal of said Y-connected diodes and by its emitter to the center tap of said transformer; and a zener-connected diode connected between the base of said third transistor and the collectors of said first mentioned transistors.

6. A device as recited in claim 2 wherein said voltage limiting means comprises: a second pair of taps on said primary winding intermediate said first pair of taps and said center tap; a first pair of diodes connected between one of said second pair of taps and the base of one of said transistors; a second pair of diodes connected between the second of said second pair of taps and the base of a second said transistor.

7. A device as recited in claim 1 wherein said voltage limiting means comprises: a second pair of taps on the primary winding of said transformer intermediate said center tap and said first pair of taps; a first pair of diodes connected together by a common terminal and connected by their non-common terminals to the bases of said transistors; a second pair of diodes connected by a common terminal and connected by their non-common terminals to said second mentioned taps; voltage dividing means connected at one end to the common terminal of said second mentioned diodes and at the other end to the center tap of said primary winding; a third transistor connected by its collector to the common terminal of said first mentioned diodes and by its emitter to the center tap of said primary winding; zener-connected diode means connected between the variable voltage tap of said voltage dividing means and the base of said transistor.

8. A device as recited in claim 7 and further comprising zener-connected diode means connected between the collectors of said first mentioned transistors and the base of said third transistor.

9. In combination: a saturable transformer having a center-tapped primary winding and a secondary winding, a pair of taps intermediate said center tap and the ends of said winding; a pair of PNP transistors push-pull connected by their bases to the ends of said primary winding and by their emitters to said symmetrically disposed taps; direct voltage means connected by its negative terminal to the collectors of said transistors and by its positive terminal to said center tap; three diodes connected together by their anodes and connected by their cathodes to the bases of said transistors and to the center tap of said transformer.

10. A device as recited in claim 9 and further comprising current limiting means connected between the bases of said transistors and the ends of said transformer.

11. A device as recited in claim 10 and further comprising: resistance means connected between the collector and base of one of said transistors to unbalance said transistor; and a parallel-connected circuit of a condenser and diode connected by its anode to the base of said unbalanced transistor and by its cathode to the adjacent end of said primary winding.

12. A circuit as recited in claim 10 and further comprising a third PNP transistor connected by its collector to the anodes of said Y-connected diodes and by its emitter to the center tap of said transformer; diode means connected by its anode to the collectors of said first-mentioned transistors and by its cathode to the base of said third transistor.

13. A circuit as recited in claim 11 and further comprising a third PNP transistor connected by its collector electrode to the anodes of said Y-connected diodes and by its emitter electrode to the center tap of said primary winding; and diode means connected by its cathode to the base of said third transistor and by its anode to the collectors of said first mentioned transistors.

14. In combination: a saturable transformer having a secondary winding and a center-tapped primary winding, a first pair of taps intermediate said center tap and the ends of said primary winding and a second pair of taps intermediate said first taps and the ends of said winding; a pair of PNP transistors push-pull connected by their bases to the ends of said primary winding, and by their emitters to said second mentioned taps, the collectors of said transistors being connected together; a direct voltage source connected by its positive terminal to said center tap and by its negative terminal to said collectors; a first pair of diodes connected together by their anodes and connected by their cathodes, respectively, to the base of one said transistor and to one of said first mentioned taps; a second pair of diodes connected together by their anodes and connected by their cathodes, respectively, to the base of the second said transistor and to the second of said first mentioned taps.

15. In combination: a saturable transformer having a secondary and a center-tapped primary winding, a first pair of taps intermediate said center tap and the ends of said winding, and a second pair of taps intermediate said first taps and the ends of said winding; a pair of substantially identical PNP transistors push-pull connected by their bases to opposite ends of said primary winding, and push-pull connected by their emitters to said second mentioned taps, the collectors of said transistors being connected together; a first pair of diodes connected by their cathodes to the bases of said transistors and connected together by their anodes; a second pair of diodes connected by their cathodes to said first mentioned taps and connected together by their anodes; a third PNP transistor connected by its collector to the anodes of said first mentioned diodes and by its emitter to the center tap of said primary winding; voltage dividing means connected at one end to the anodes of said second mentioned diodes and at the other end to the center tap of said primary winding; diode means connected by its anode to the variable voltage tap of said voltage dividing means and by its cathode to the base of said third transistor; diode means connected by its anode to the collectors of said first mentioned transistors and by its cathode to the base of said third transistor; and direct voltage means connected by its positive terminal to the center tap of said transformer and by its negative terminal to the collectors of said first mentioned transistors.

16. In combination: a saturable transformer having a secondary winding and a center-tapped primary winding, a pair of taps intermediate said center tap and the ends of said primary winding; a pair of substantially identical NPN transistors push-pull connected by their bases to opposite ends of said primary winding and by their emitters to said intermediate taps, the collectors of said transistors being connected together; a source of direct voltage connected by its negative terminal to the center tap of said transformer and by its positive terminal to the collectors of said transistors; three diodes Y-connected by their cathodes with their anodes connected to the bases of said transistors and to the center tap of said transformer.

17. A circuit as recited in claim 16 and further comprising a third NPN transistor connected by its collector to the cathodes of said Y-connected diodes and by its emitter to the center tap of said transformer; diode means connected by its cathode to the collectors of said first mentioned transistors and by its anode to the base of said third transistor.

18. In combination: a saturable transformer having a secondary winding and a center tapped primary winding, a first pair of taps intermediate said center tap and the ends of said primary winding, and a second pair of taps intermediate said first mentioned taps and the ends of said winding; a pair of NPN transistors push-pull connected by their bases to opposite ends of said primary winding, and by their emitters to said second mentioned taps, the collectors of said transistors being connected together; direct voltage means connected by its negative terminal to the center tap of said transformer and by its positive terminal to said collectors; a first pair of diodes connected together by their cathodes with their anodes connected to the base of one of said transistors and to one of said first mentioned taps; a second pair of diodes connected together by their cathodes and with their anodes connected to the base of the second of said transistors and to the second of said first mentioned taps.

19. In combination: a saturable transformer having a secondary winding and a center tapped primary winding, a first pair of taps intermediate said center tap and the ends of said primary winding, and a second pair of taps intermediate said first mentioned taps and the ends of said primary winding; a pair of NPN transistors push-pull connected by their bases to opposite ends of said primary winding and by their emitters to said second mentioned taps, and having their collectors connected together; direct voltage means connected by its negative terminal to the center tap of said transformer and by its positive terminal to said collectors; a pair of diodes connected together by their cathodes and having their anodes connected to the bases of said transistors; a second pair of diodes having their cathodes connected together and their anodes connected to said first mentioned taps of said primary winding; a third NPN transistor connected by its collector to the cathodes of said first mentioned diodes and by its emitter to the center tap of said transformer primary winding; voltage dividing means connected by one end to the cathodes of said second mentioned diodes and by the other end to the center tap of said primary winding; diode means connected by its anode to the base of said third transistor and by its cathode to the variable voltage tap of said voltage dividing means; diode means connected by its cathode to the collectors of said first mentioned transistors and by its anode to the base of said third transistor.

20. The combination of claim 1, containing in addition, current limiting means connected between the bases of said transistors and the ends of said primary winding.

21. The combination of claim 20, containing in addition, means for unbalancing one of said transistors to cause a starting transient.

22. A device as recited in claim 4, containing in addition, current limiting means connected between the bases of said transistors and the ends of said primary winding.

23. A device as recited in claim 6, containing in addition current limiting means connected between the bases of said transistors and the ends of said primary winding.

24. A device as recited in claim 23, containing in addition, means for unbalancing one of said transistors to cause a starting transient.

25. A device as recited in claim 24, wherein said means for unbalancing one of said transistors comprises current limiting means connected between said collectors of said transistors and the base of one of said transistors, a single diode connected between an end of said primary winding and a first current limiting means in said current limiting means, and capacitor means connected in parallel with said single diode.

26. A device as recited in claim 20, and further comprising current limiting means connected between the emitters of said transistors and said intermediate taps.

27. A device as recited in claim 21 and further comprising current limiting means connected between the emitters of said transistors and said intermediate taps.

28. A device as recited in claim 5 and further comprising current limiting means connected between the bases of said transistors and the ends of said primary winding, and current limiting means connected between the emitters of said transistors and said intermediate taps.

29. A device as recited in claim 8 and further comprising current limiting means connected between the bases of said transistors and the ends of said primary winding, and current limiting means connected between the emitters of said transistors and said first pair of taps.

30. A device as recited in claim 29 and further comprising means for unbalancing one of said transistors to cause a starting transient.

31. A device as recited in claim 30 wherein said means for unbalancing one of said transistors comprises current limiting means connected between said collectors of said transistors and the base of one of said transistors, a single diode connected between an end of said primary winding, and the first current limiting means in said current limiting means, and capacitor means connected in parallel with said single diode.

References Cited in the file of this patent

UNITED STATES PATENTS

| | | |
|---|---|---|
| 2,832,900 | Ford | Apr. 29, 1958 |
| 2,837,651 | Schultz | June 3, 1958 |
| 2,854,651 | Kircher | Sept. 30, 1958 |

OTHER REFERENCES

Electronics, page 60, Aug. 7, 1959.